Patented Nov. 13, 1945

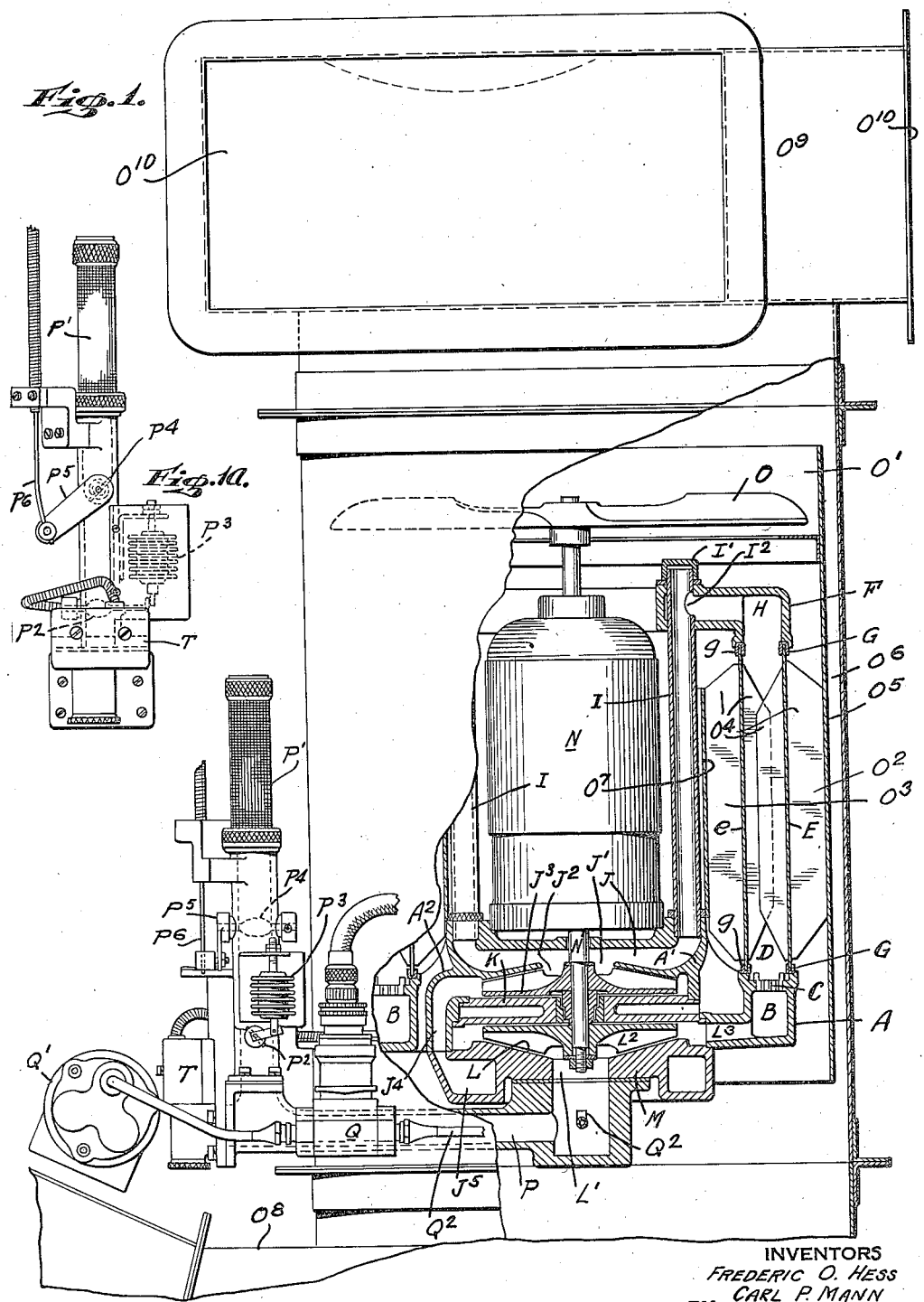

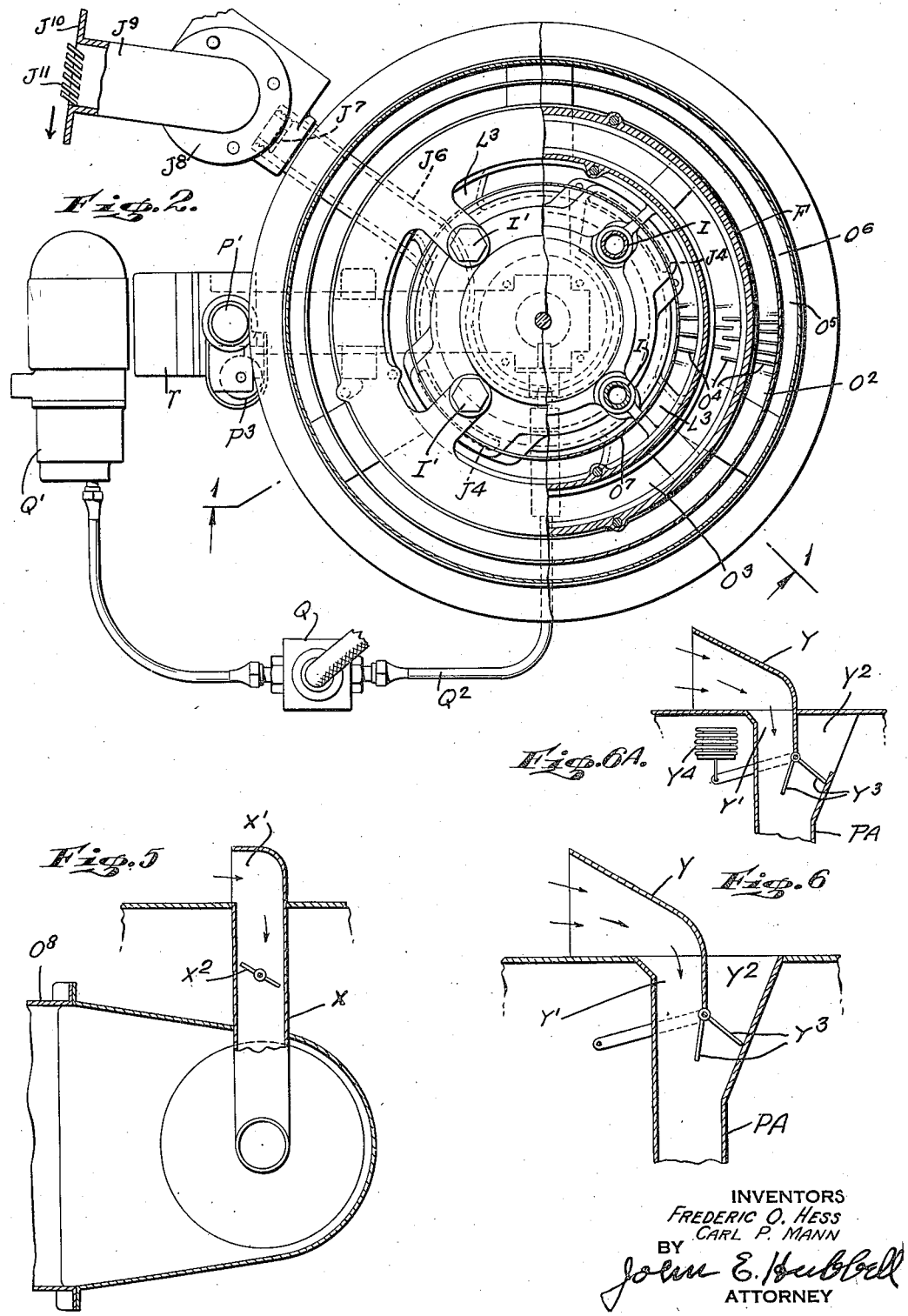

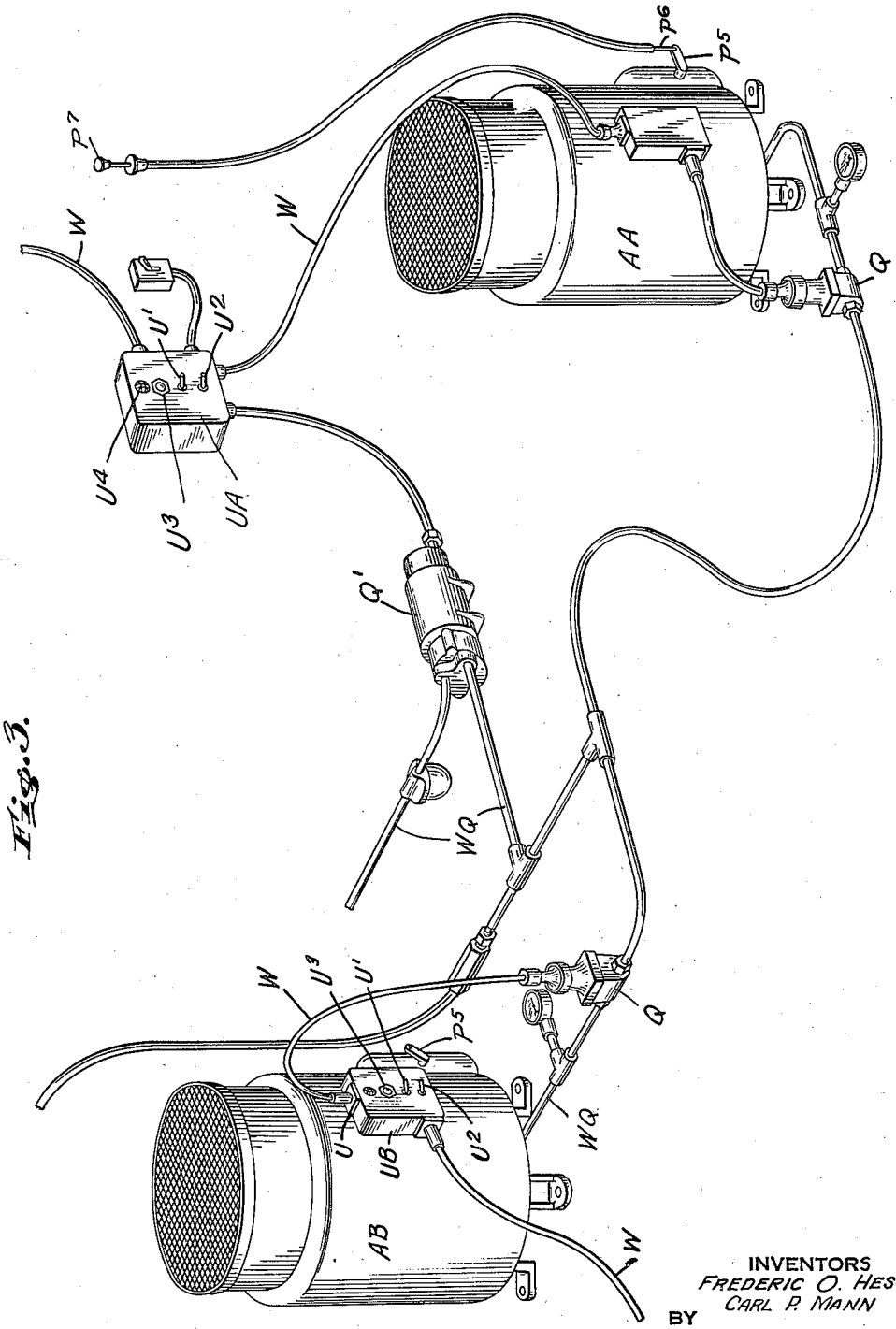

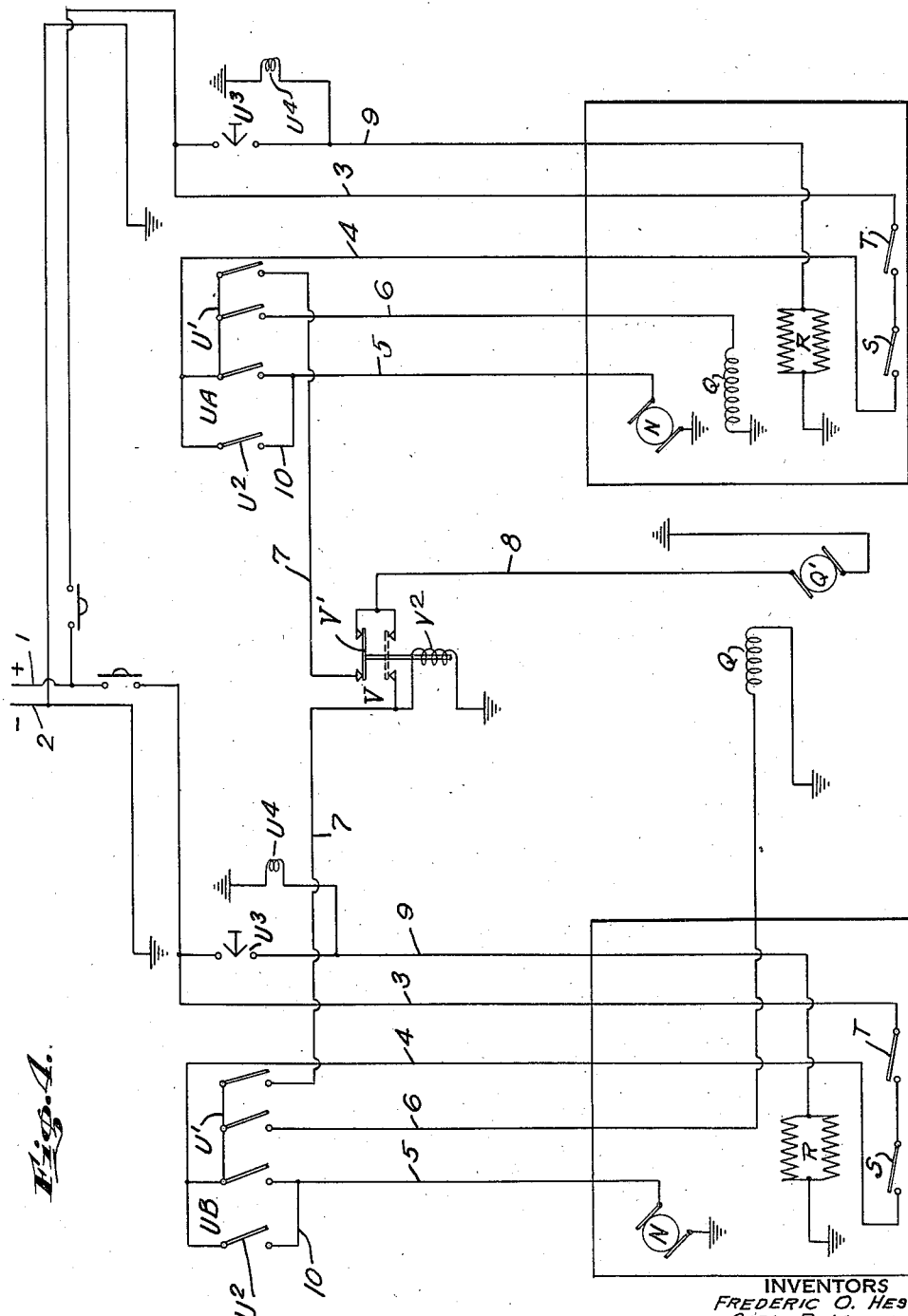

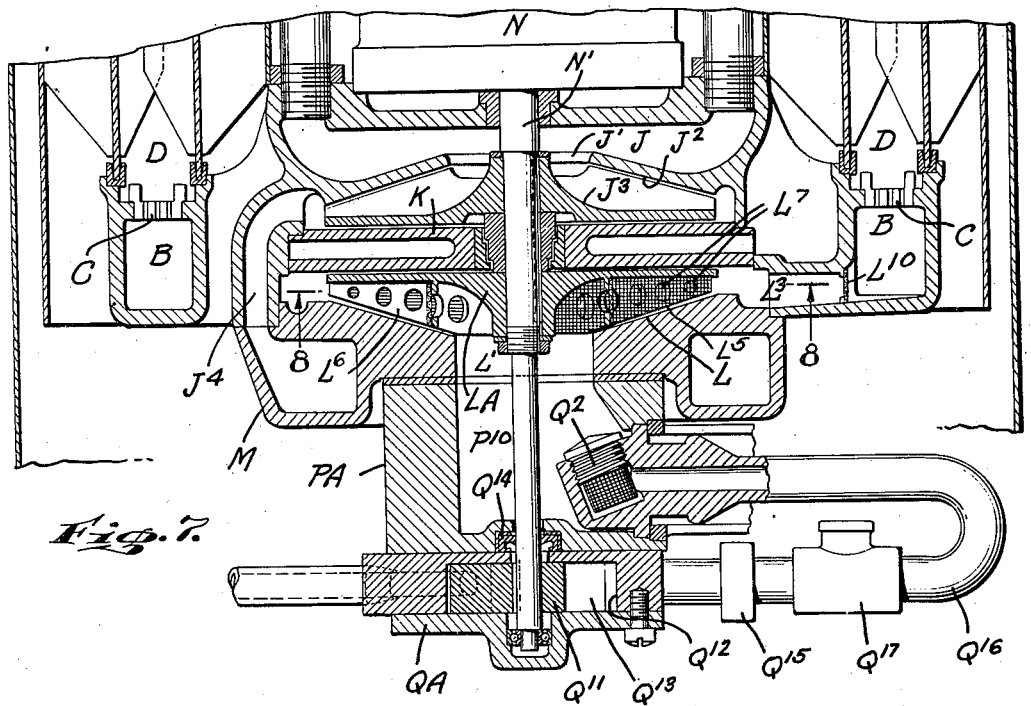
Fig. 7.
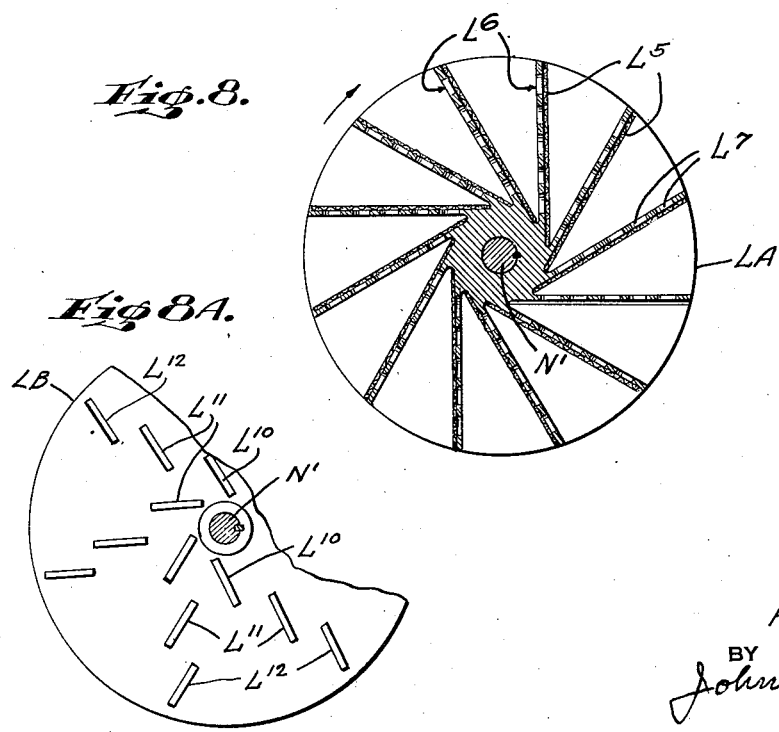
Fig. 8.
Fig. 8A.
INVENTORS
FREDERIC O. HESS
CARL P. MANN
BY John E. Hubbell
ATTORNEY

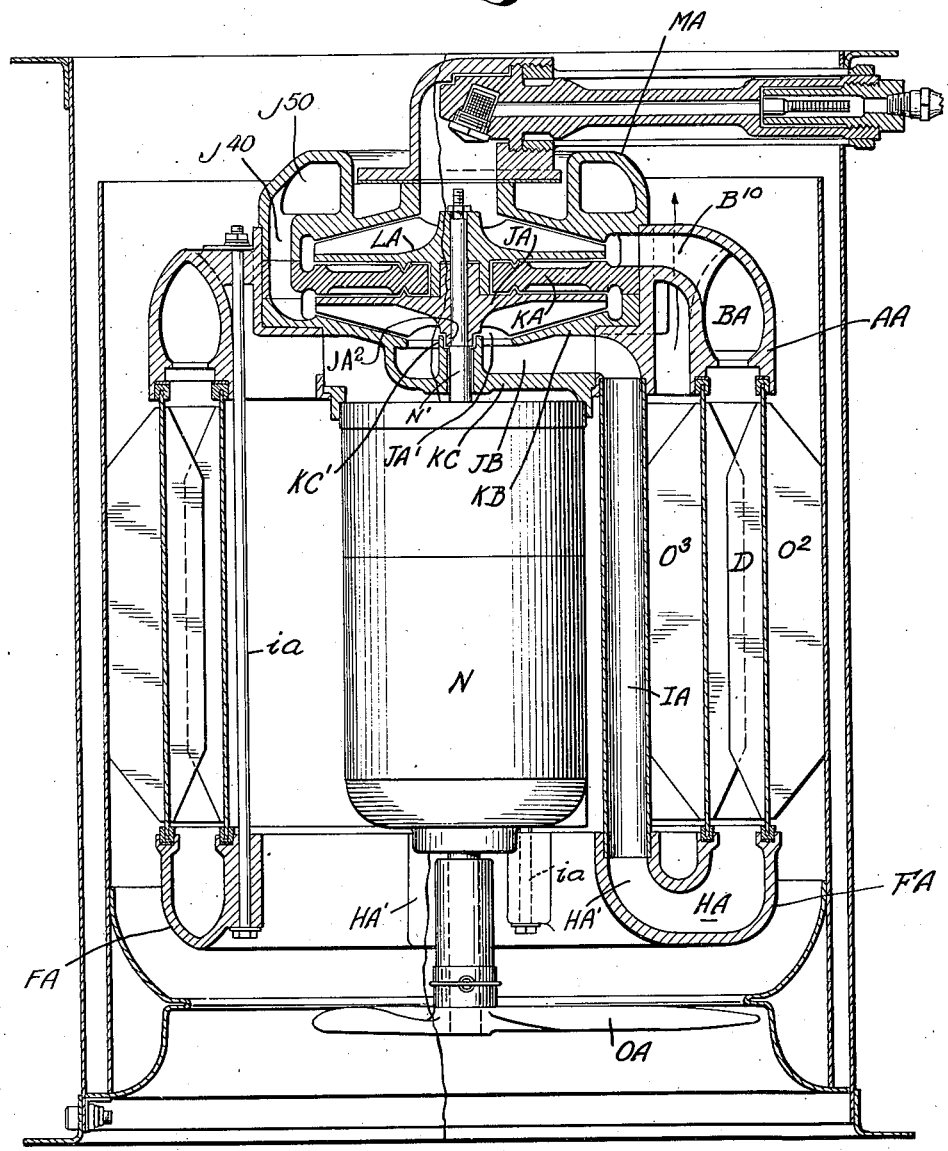

2,388,970

UNITED STATES PATENT OFFICE 2,388,970

AIRPLANE HEATING MEANS

Frederic O. Hess, Germantown, Pa., and Carl P. Mann, Riverton, N. J., assignors to Selas Corporation of America, a corporation of Pennsylvania Application July 11, 1942, Serial No. 450,577

16 Claims. (Cl. 126—110)

The general object of the present invention is to provide improved means for heating airplanes. More specifically stated, general objects of the present invention are to provide an improved airplane heater of the general type disclosed in Patent No. 2,314,089, granted March 16, 1943.

A specific object of the present invention is to provide improved means for supplying combustion air at the proper rate to an airplane heater notwithstanding the wide variations in the pressure of the atmosphere surrounding the airplane as a result of changes in airplane altitude and the tendency of changes in the relative movement of the airplanes and the atmosphere in which it is moving to vary the rate of combustion air flow, when the combustion air is drawn into the airplane from the external atmosphere through one port and the products of combustion are discharged into the external atmosphere through a second port displaced from the first mentioned port.

A further object of the invention is to provide means for passing air from the surrounding atmosphere to the cabin space in such manner as to desirably modify the cabin space temperature or pressure.

Airplane heaters of the type disclosed in the aforementioned patent are used to heat air for circulation in airplane spaces such as cabin and gun turrets which need to be heated, and for use in wind shield defrosting and other purposes in which relatively intense localized heating effects are desired. Such heaters are characterized by their relatively small bulk and weight, and by their ability to burn aviation gasoline as required to maintain an unusually high rate of heat liberation per unit of combustion space volume, and a correspondingly high rate of heat transfer from a heating space to air to be heated and passing in thermal exchange relation therewith.

Our present invention comprises structural improvements devised to improve and simplify the construction of heaters of the type specified and to facilitate their disassembly and reassembly. Our present invention comprises improved means for supplying and regulating the supplies of gasoline and combustion air to an airplane heater and for regulating the flow of the air heated to and through the heaters, and the present invention in preferred forms is characterized in particular by the arrangement of rotary fans or blowers employed to move combustion air into and to move products of combustion away from the combustion chamber of an airplane heater. Our present invention also comprises improvements which facilitate the starting of the heater into operation at low temperatures.

The various features of novelty which characterize our invention are pointed out with particularity in the claims annexed to and forming a part of this specification. For a better understanding of the invention, however, its advantages, and specific objects attained with its use, reference should be had to the accompanying drawings and descriptive matter in which we have illustrated and described preferred embodiments of the invention.

Of the drawings:

Fig. 1 is an elevation of an airplane heater, partly in section on the broken line 1—1 of Fig. 2;

Fig. 1A is an elevation illustrating combustion air throttling means included in the apparatus shown in Fig. 1;

Fig. 2 is a plan view partly in section;

Fig. 3 is a somewhat diagrammatic illustration of an airplane heating system including two heaters and fuel supply and electrical connections therefor;

Fig. 4 is a wiring diagram showing control provisions for a heating system of the type shown in Fig. 3;

Fig. 5 is a somewhat diagrammatic view illustrating an airplane heater and means for supplying more or less of the air to be heated from the external atmosphere;

Figs. 6 and 6A are each views generally similar to Fig. 5 and illustrating a different air supply arrangement;

Fig. 7 is a fragmentary sectional elevation taken similarly to Fig. 1 illustrating modified gasoline and combustion air supply means;

Fig. 8 is a partial section on the line 8—8 of Fig. 7;

Fig. 8A is a view taken similarly to Fig. 8 and illustrating a modification; and Fig. 9 is a view similar to Fig. 1 and illustrating another modification of the invention.

The heater structure illustrated in Figs. 1 and 2 includes a base member A which ordinarily is an aluminum casting; and is formed with an annular burner chamber B surrounding a central fan housing portion A' connected to the wall of the burner chamber B by integral connecting arm portions A². As shown, the burner inlet chamber B is open at its upper side, and the casting A is recessed to provide a seat for an annular orifice wall C which separates the burner inlet chamber B from the annular heating space or chamber D of the heater. Advantageously, the orifice wall C is formed of thin, radially extending, plate like members of ceramic material having orifice forming grooves in their sides which are adapted to pass a combustible mixture from the chamber B into the chamber D, generally as disclosed in Patent 2,228,114, granted January 7, 1941.

The inner and outer walls of the space D are hollow cylinders $e$ and E which may be aluminum castings but which as shown, are formed of sheet metal parts and each clamped between the base casting A and a top casting F, both of which are ordinarily formed of aluminum. As shown, the upper and lower edges of the wall E are received in slots formed in the adjacent sides of upper and lower clamping rings G, and the upper and lower edges of the wall $e$ are received in slots formed in clamping rings $g$ which differ from the clamping rings G only that they are of smaller diameter. The castings A and F are rabbeted to provide seats for the clamping rings $g$ and G.

The top casting is formed with an annular chamber H into which the upper end of the chamber D opens. Products of combustion passing from chamber D into chamber H, pass down from the latter through tubes I disposed between the heater axis and the chamber D, and serving as hollow tie bolts connecting the castings A and F. As shown, there are four tubes I, each of which has its lower end threaded into a corresponding opening in the top wall of an exhaust fan inlet chamber J formed in the fan housing portion $A'$ of the bottom casting. Each tube I has its upper end engaged by a cap nut $I'$ threaded on the upper end of the tube and engaging the top wall of the top casting F, thereby clamping the walls E and $e$ between the castings A and F. Each cap nut $I'$ also forms a closure for the upper end of the bore of the corresponding tube I. Each tube I is formed with a lateral opening or port $I^2$ through which products of combustion pass from the chamber H into the bore of the tube.

The fan inlet chamber J communicates through a central port $J'$ with a subjacent exhaust fan chamber $J^2$ having its top wall formed by the housing $A'$ and having its bottom wall formed by a separable disc-like partition member K. The member K also forms the top wall of a combustion air supply fan chamber L. The bottom wall of the chamber L is formed by a separable fan housing member M. A rotating fan $J^3$ of the turboblower type is mounted in the chamber $J^2$ and draws products of combustion from the inlet chamber J through the port $J'$ and discharges those products through downwardly extended channels $J^4$. The latter are formed in the portion of the casting A between the disc K and the burner chamber B, and their lower ends communicating with an annular outlet chamber $J^5$ formed in the subjacent housing member M. As shown most clearly in Fig. 2, the chamber $J^5$ is provided with an outwardly extending outlet passage $J^6$ through which the products of combustion formed in the heater are discharged into the atmosphere enveloping the heater. In a preferred form of the present invention, the outlet passage includes a throttling device which may be a valve or damper, but as shown in Fig. 2 is a replaceable disc having a restricted orifice $J^7$. The outlet passage $J^6$ is connected to a flanged connector $J^8$, and, in order to discharge the products of combustion to the atmosphere enveloping the aircraft, a conduit $J^9$ may be provided which is fixed at one end to the connector $J^8$ and terminates at its other end at the shell or skin $J^{10}$ of the aircraft in which the heater is installed. A louvre $J^{11}$ may be provided at the skin $J^{10}$ through which the products of combustion are discharged from conduit $J^9$ when the aircraft is traveling in the direction indicated by the arrow in Fig. 2.

Referring to Fig. 1, fan casing element M is formed with a central inlet $L'$ to the fan chamber L, through which a fan $L^2$ of the turboblower type working in the chamber L draws in air for combustion. The air thus moved through the chamber L is passed from the latter through discharge conduits $L^3$ to the burner inlet chamber B. As hereinafter explained, the air thus passed into the bottom part of chamber D may be supplied and regulated in various ways, and entrains and carries with it atomized gasoline which in conjunction with the air forms the combustible fuel mixture burned in the chamber D in the region or zone adjacent to the orifice wall C through which the fuel mixture issues in a plurality of small streams.

As shown in Fig. 1, the combustion air supply fan $L^2$ and the exhaust fan $J^3$ are carried by the lower end portion of the shaft $N'$ of an electric motor N, preferably a series motor which is centrally disposed within the heater. The upper end of the motor shaft of the motor N carries an air circulating fan or blower O employed to move the air being heated through the heater. As shown in Fig. 1, the circulation fan O works in a fan chamber $O^1$ receiving heated air from outer and inner spaces $O^2$ and $O^3$ at the outer and inner sides respectively, of the chamber D. To increase the rate at which heat is given up by the heated gases in chamber D to the air moving through the spaces $O^2$ and $O^3$, the walls E and $e$ are each provided with internal and external radial fins or ribs $O^4$ of sheet metal. The fins $O^4$ extending radially away from the outer wall E are surrounded and have their outer edges in contact with a cylindrical sheet metal shell $O^5$. In some cases the latter may form the outer heater casing, but as shown in Figs. 1 and 2, the wall $O^5$ is spaced inwardly from a separate heater casing to provide a narrow annular heat and sound insulating space $O^6$. The inner edges of the fins $O^4$ at the inner side of the wall $e$ engage a cylindrical baffle $O^7$.

As shown in Fig. 1, the fan O draws air to be heated from a receiving chamber $O^8$ beneath the heater space in which the heater is located. The air passes into the lower ends of the annular spaces $O^2$ and $O^3$ and into the space surrounded by the baffle $O^7$, and receiving the motor N which is thereby cooled.

As shown in Fig. 1, the fan chamber $O^1$ is beneath and opens into a distributing chamber $O^9$ having a plurality of outlets which may deliver heated air to conduits, not shown, for conveying the air to various points of use. In some cases, however, the upper end of the outlet chamber $O^1$ may open directly to the space in which the heater is located, as is the case with each of the heaters AA and AB shown in Fig. 3.

Combustion supporting air is supplied to the inlet $L'$ of the fan chamber L, by a supply pipe P, which in some cases may lead to an inlet louvre carried by the airplane shell and supply air drawn directly from the external atmosphere. Ordinarily, and as shown, however, the inlet pipe P is arranged to receive air from the airplane cabin space in which the heater is mounted, a fire check $P'$ being provided to avoid risk of back fire into the space. Advantageously, the inlet pipe P includes a damper $P^2$ shown as a butterfly valve, and a device $P^3$ operable responsive to atmospheric pressure for adjusting the damper $P^2$ to reduce its throttling effect as the atmospheric pressure diminishes at high airplane altitudes from the initial maximum throttling condition of the damper which exists when the atmospheric pressure is highest at ground level.

Advantageously, the inlet pipe P also includes a second manually operable butterfly valve P⁴. As shown in Fig. 1A the valve P⁴ is provided with an operating arm P⁵ spring biased into the wide open position of the valve. The valve P⁴ is provided primarily to enable the airplane pilot to facilitate ignition in starting the heater into operation by temporarily choking the combustion air supply and thereby increasing the fuel to air ratio in the mixture supplied to the burner inlet chamber B. When convenient, the lever P⁵ may be actuated directly by the fingers of the pilot, as is contemplated in the case of the heater AB shown in Fig. 3. In other cases, however, the pilot operator may actuate the lever P⁵ through a flexible transmitter P⁶ from a conveniently located push button P⁷, as partly illustrated in Fig. 1A and shown more fully for the heater AA in Fig. 3.

The supply of gasoline to each heater is controlled by a solenoid valve Q individual to the heater and interposed in the pipe through which liquid fuel is supplied by a pump Q' to a nozzle Q². The latter has a restricted orifice through which a jet of gasoline is discharged against the inner portion of the impeller of the combustion air supply fan L². The latter thus serves as a mechanical atomizer for the liquid fuel, breaking the latter up into minute particles which are entrained by the combustion air supplied to the burner chamber B. Advantageously, each heater is provided with a thermostatic switch S, as shown most clearly in the wiring diagram in Fig. 4, which automatically interrupts the supply of fuel to the heater when the heater combustion chamber temperature rises unduly, as it may do when the normal flow of air to be heated to the spaces O² and O³ is reduced or interrupted. As shown in Fig. 4, an igniter R of the hot wire type is provided for use in igniting the fuel and air mixture passing from the burner chamber B into the bottom part of the chamber D through the orifices in the ceramic burner wall C.

Advantageously, each heater is provided with safety means T, as diagrammatically indicated in Fig. 4, which is preferably of the type disclosed and claimed in application Serial No. 440,780 of Richard E. B. Wakefield, filed April 28, 1942, and assigned to the present assignee, comprising a switch which opens automatically when gasoline accumulates in the heater.

The particular heating and control system shown in Figs. 3 and 4 is provided for two heaters AA and AB, each of which may be generally like the heater A shown in Figs. 1 and 2 are just described. Each of the heaters AA and AB is open at its lower and upper ends to receive air to be heated directly from the space in which the heater is located and to return the heated air to the space.

In the particular system shown in Fig. 3, the heater AA is intended for use in the pilot's cabin or such other portion of the airplane making it advantageous to control the heater through a control box UA conveniently mounted on or adjacent the pilot's switchboard, while the heater AB is intended for use in bombardier's cabin space or in some other portion of the airplane making it convenient to have the heater AB controlled through a control box UB which is mounted on the heater itself, and which may be identical with the control box UA. The heating system shown in Fig. 3, includes a single fuel pump Q' which serves both heaters AA and AB, and is put into and out of operation by the control box UA. However, by the use of control system shown in Fig. 4 the operation of the pump may be controlled from either control box UA or UB.

As shown in Fig. 3, each of the control boxes UA and UB comprises a main heater switch U', a second switch U², a push button ignition switch U³, and a signal light U⁴. As shown in Fig. 4, the heater circuits are energized from the airplane supply conductors 1 and 2, and the conductor 2 and each of the different heating system control elements energized from the conductor 2 has a ground connection. The switch U' of each control box is normally connected to the supply conductor 1 through a circuit branch including in series a conductor 3, the corresponding gasoline detector switch T, thermostatic switch S, and a conductor 4.

As shown, the switch U' is a three blade switch which in its closed position connects the conductor 4 to each of conductors 5, 6, and 7 and thereby connects each of the latter to the supply conductor 1. The energization of the conductor 5 puts the corresponding heater motor N into operation, and the energization of the conductor 6 energizes the corresponding solenoid valve Q. The control arrangement shown in Fig. 4 includes a relay switch V so associated with the two conductors 7 and the electrically driven fuel pump Q' that the latter may be started into operation by the closing of either switch U' and, after being started, will remain in operation as long as either switch U' is closed. The switch V includes a switch member V' biased to its upper position shown in full lines in Fig. 4 in which it directly connects the conductor 7 extending away from the control box UA to the energizing conductor 8 for the fuel pump Q'. When the switch U' of the control box UB is closed, the corresponding conductor 7 energizes a solenoid coil V² and thereby pulls the switch member V' into its dotted line position shown in Fig. 4. In its dotted line position the member V' connects the conductor 7 associated with the control box UB to the fuel pump conductor 8. With the above described arrangement the pump Q' will be in operation while either switch U' is closed. If the switch U' of the control box UB is closed, the relay coil V² will then hold the relay switch member V' in its lower position, and the opening and closing of the other switch U' will have no effect whatever on the energization of the motor for the fuel pump Q'. If the switch U' of the box UB is opened while the switch U' of the box UA is closed, the energization of the pump Q' will be maintained through the conductor 7 associated with the control box UA after the relay switch member V' moves into its upper position.

To permit each heater motor N to operate for ventilation purposes during periods in which the fuel pump Q' is not in operation, the switch U² of each of the control boxes UA and UB is adapted when closed to connect a branch 10 from the corresponding conductor 5 to the associated conductor 4. The closure of either push button switch U³ connects a conductor 9 to the corresponding conductor 3 and thereby energizes the corresponding hot wire igniter R and the corresponding pilot light U⁴. Ordinarily, all that is necessary to properly ignite each heater is to hold the corresponding ignition switch U³ closed for a few seconds.

In Fig. 3, W designates cables including control conductors, and WQ designates fuel piping associated with the pump Q'. The piping customarily includes a connection to a source of gasoline which may be the airplane engine supply piping, and also includes a pressure regulating by-pass connection between the pump inlet and outlet.

In many cases all the air to be heated is taken into the lower end of the heater from the space in which the latter is located or from some other interior portion of the airplane. In some cases it is desirable, however, to take some of the air to be heated directly from the external atmosphere. Thus, as shown in Fig. 5, an air supply pipe conduit X is provided having its inlet end X' open to the atmosphere enveloping the airplane and its discharge end opening into the receiving chamber O⁸ of a heater, so that air discharged will be drawn into the air heating spaces O² and O³ by the fan O. As shown, the inlet end X' of conduit X is in the form of a scoop so formed and disposed that the motion of the airplane will cause the pressure of the air entering the conduit X to exceed the atmospheric pressure in the space in which the heater is located when that space is not supercharged.

The pipe X is provided with a damper X² shown as a butterfly valve which may be adjustable to variably throttle the flow through the pipe X, so that air drawn through the air heating passages O² and O³ may thus be a regulable mixture of cold fresh air supplied by the pipe X with the warmer and less fresh air drawn into the chamber O⁸ from the interior of the airplane. The damper X² thus forms a means for the ready manual control of the temperature of the space heated.

By the provisions of a suitable shaped scoop or inlet louvre it is possible to supply a limited amount of air to the heater under a pressure which will normally exceed the pressure in the space heated by the heater of the external atmosphere by a pound or two. Such a supercharging effect may well be used in some cases to increase the weight rate at which combustion air is passed into the heater by the fan L². To permit such combustion air supercharging action to be regulated, use may be made of the arrangement shown in Fig. 6 in which the combustion air supply conduit PA has one inlet Y' into which air is directed by an external scoop Y, and a second inlet Y² communicating with the atmosphere through a simple opening in the skin of the airplane body back of the scoop Y, or use may be made of the arrangement shown in Fig. 6A, in which the inlet Y² opens into the cabin space. As shown, the relative amounts of air supplied to the conduit PA through its inlets Y' and Y² may be regulated by a damper Y³ adjustable to inversely vary the throttling effects which it impresses on the inlets. The damper Y³ may be adjusted manually, or, as shown in Fig. 6A, by a bellows device Y⁴ which elongates and contracts as the atmospheric pressure decreases and increases. As will be apparent, each of the arrangements shown in Figs. 5, 6 and 6A may be used in supplying supercharged air either to the heater combustion space or to the cabin spaces to be heated, but ordinarily the damper Y³ of Figs. 6 and 6A should not be automatically adjusted by a pressure responsive device Y⁴ when used to supply supercharged air to cabin space. For such use the regulator Y⁴ of Fig. 6A may well be a thermostatic device which increasingly throttles the inlet Y' and reduces the throttling of the inlet Y² as the cabin temperature decreases.

The electric motor N is preferably a series motor, since as is explained in the application, Serial No. 409,439, filed September 4, 1941, by Frederic O. Hess, one of the applicants herein, a series electric motor driving an airplane heater fan of suitable type, tends to deliver air at a constant weight rate regardless of the wide variations in air density at widely different altitudes.

We have discovered, however, that a variation in fan speed in inverse proportion to the density of the gas moved by the fan, is not of itself sufficient to insure that combustion air will be supplied to an airplane heater at a constant weight rate when the ports respectively employed for the admission of combustion air to the airplane and the discharge from the airplane of products of combustion, are so formed and disposed that appreciable differences between the pressures in these ports and the pressure of the enveloping atmosphere occur as a result of the varying movements of the airplane relative to the atmosphere through which it moves due to changes in wind velocity, propeller speed and flight direction.

In the course of extensive flight tests of an airplane heater of the general type disclosed herein, we found that the difference between the pressure of the enveloping atmosphere and the pressure in the louvre J¹¹ through which the heater products of combustion were discharged into the atmosphere varied at times as much as 9" of water, and that analogous pressure variations were experienced in the combustion air intake when the latter drew air directly from the enveloping atmosphere. We have also found, however, that with the apparatus illustrated in Figs. 1 and 2, it is possible to maintain an approximately constant heat output from our heater, notwithstanding the above described pressure conditions. Specifically, we have found that an exhaust fan formed and driven as in the fan J³, may be used to give the exhaust gases a pressure head as great as 19 inches of water. With such a pressure head at the inlet side of the throttling device J⁷ at the discharge end of the exhaust conduit, the above mentioned pressure variation of 9 inches of water at the outlet side of the throttling device produces a maximum pressure variation at the inlet side of the throttling device amounting only to about 2½ inches of water, and the last mentioned pressure variation is not great enough to prevent satisfactory operation of the heater.

The use of a combustion air supply fan L² of the high speed turbo blower type in conjunction with a coaxial similar exhaust fan J³ and means for suitably throttling the inlets to the two fans, minimizes the effect on the heater performance of the variations in pressure at the inlet side of the discharge orifice J⁷, and also provides compensation for variations in the combustion air intake pressure. The above described dampers P² and P⁴ form convenient means for providing the combustion air intake throttling effect needed, as well as for use in increasing the fuel-air ratio in starting the heater into operation and in compensating for the tendency of the weight rate of combustion air supply to diminish as the airplane altitude increases. This tendency is particularly marked when the load on the circulating fan O is increased by some supercharging of the airplane cabin atmosphere.

The fact that the heater intake and exhaust fans $J^3$ and $L^2$ are identical in construction, design and speed of operation, contributes to the avoidance of objectionable fluctuations of pressure in the heater combustion chamber, as is desirable for the maintenance of uniform heater operation, and minimizes the risk of objectionable leakage between the heating chamber D and the air spaces $O^2$ and $O^3$ of the heater. The formation of the two combustion air and exhaust fan chambers in the base member or structure collectively formed by the members A, K and M, contributes to the mechanical simplicity and compactness of the heater.

The control provisions illustrated in Figs. 3 and 4 are characterized by their simplicity and effectiveness. Owing to the ease with which the heater may be started into and cut out of operation, it is readily possible to suitably regulate the temperature in the airplane cabin space being heated by intermittent operation of the heater. While it is theoretically possible, of course, to provide thermostatic means for automatically regulating the heat output of the heating system in response to the temperature at which the air is heated or to the cabin space temperature, we have concluded that the manual control provided for herein is preferable.

In the regular use of our heaters, now contemplated, in airplanes attaining an altitude of 40,000 feet, we believe it will ordinarily be advantageous to supercharge the combustion air supply to the heater when an altitude of 20,000 feet is attained, and to increase the supercharging effect as the airplane altitude increases above 20,000 feet. Whether the supercharging effect is created by a supercharging fan motor or by an arrangement like that shown in Fig. 6, it may be automatically increased as the atmospheric pressure diminishes by the use of a bellows element like the element $P^3$ of Fig. 1. In some cases the element $P^3$ of Fig. 1 may be used to adjust the damper $P^4$ and the damper $P^2$ may then be omitted or made subject to manual adjustment. In general, no separate means for supercharging the combustion air will be needed when the combustion air is withdrawn from an airplane cabin space which is supercharged when the airplane is operating at high altitudes.

As previously indicated we consider it advantageous, in some cases at least, to include in each airplane heater an individual pump for supplying to the heater the gasoline burned therein, and Fig. 7 illustrates a preferred form of an arrangement devised by us for the purpose. In the arrangement shown in Fig. 7 PA represents a heater base member attached to the underside of the member M and formed with a central chamber $P^{10}$ through which the combustion air supply pipe P communicates with the combustion air fan inlet L', and in which the gasoline spray nozzzle $Q^2$ is mounted, and the casing of a gasoline pump QA is secured to the underside of the member PA.

The pump QA is of the rotary impeller type and may be of known form. As shown, its impeller is of well known form comprising a cylindrical piston body $Q^{11}$ eccentrically disposed in the pump chamber $Q^{12}$ and slotted to receive piston blades $Q^{13}$ which have their outer end edges pressed by centrifugal force action against the peripheral wall of the pump chamber $Q^{12}$.

The piston body $Q^{11}$ is secured to the extended lower end of the shaft N' of the motor which drives the pump QA in addition to the fans in the arrangement shown in Figs. 1 and 2. The shaft N' extends through stuffing box provisions $Q^{14}$ provided to prevent leakage from the pump chamber $Q^{12}$ into the chamber $P^{10}$. The outlet from the pump chamber QA is connected by a union $Q^{15}$ to one end of a pipe section $Q^{16}$ shown as of a U form and having a second end mounted in the member PA and supporting the discharge nozzle $Q^2$. In some cases, a loaded check valve $Q^{17}$ may be employed to prevent gasoline leaking through the pump and nozzle member $Q^2$ into the heater when the pump is out of operation.

With the gasoline supplied to the chamber D of each heater by an individual pump operated by the fan driving motor of the heater, the airplane heating control provisions, as well as the heating system apparatus are materially simplified. In some cases no valve like or analogous to the previously described solenoid valve Q need be associated with each heater. However, such a valve may be located at the inlet side of the pump QA for safety purposes with advantage in some cases. Such a valve also facilitates the use of the air circulating fan O of the heater for ventilation purposes when the heater is not in operation. For the last mentioned purpose, however, the solenoid valve in the pump inlet line may be replaced by a simple, manually operable cut off valve. Ordinarily, the pump QA will be provided with a pressure relief or control by-pass, but such by-pass has not been shown and need not be described, however, as it is a customary adjunct of liquid pumps. With an individual gasoline pump for each heater, the different heaters included in an airplane heating system may be independently controlled units and each control switch U' need include but one blade or two blades accordingly as the solenoid valve Q is eliminated or retained.

In Figs. 7 and 8 we have also illustrated the use of a form of gasoline vaporizing provisions which, as previously stated, are advantageously associated for ignition purposes in some cases, with the provisions for mechanically atomizing the gasoline. Such vaporizing provisions as shown in Figs. 7 and 8 comprise fine wire gauze $L^5$ mounted on and supported by the vanes $L^6$ of the combustion air impeller LA which may be identical with the impeller $L^2$ of Fig. 1, except for the gauze material $L^5$ supported by the vanes $L^6$, and the formation of openings $L^7$ in the vanes $L^6$. In operation some air flows through the ports $L^7$ and thus augments the gasoline flow retarding and vaporizing action of the gauze $L^5$ on the atomized gasoline. In addition to the gauze mounted on the impeller LA, wire gauze or other gasoline flow retarding means $L^{10}$ may be mounted in the passages $L^3$ through which the combustion air and gasoline passes from the pump chamber L into the burner chamber B.

As explained in the aforementioned Patent No. 2,314,089, in burning lead treated, high octane, aviation gasoline in a burner of the type disclosed herein, the passage of the gasoline through the orifices in the hot ceramic orifice wall C, while the gasoline is an atomized, as distinguished from a vaporized, condition is desirable, because it substantially reduces the risk that lead deposits will impair the operation of the burner. We have found, however, that the vaporization of a small portion of the gasoline, sufficient to eliminate serious ignition difficulties at low temperatures, can be effected without objectionable impairment of the burner due to lead deposits.

The difficulty experienced with such apparatus as that shown in Figs. 1 and 7, in igniting the mixture of combustion air and atomized gasoline at very low temperatures is due, we believe, to the fact that under such conditions the finer particles of atomized gasoline and the small amount of gasoline vaporized by the mechanical atomizing means heretofore used, coalesce into larger drops and either fail to pass through the orifices in the burner wall C or fail to ignite in their very cold condition.

In Fig. 8A we have illustrated a gasoline atomizing, combustion air fan impeller LB differing from the impeller LA in that it is formed with sets of vanes $L^{10}$, $L^{11}$ and $L^{12}$, at progressively greater distances from the impeller axis. Each vane $L^{11}$ is angularly displaced to the rear of an adjacent vane $L^{10}$, having reference to the direction of impeller rotation which is indicated by an arrow in Fig. 8, and each vane $L^{12}$ is similarly displaced to the rear of an adjacent vane $L^{11}$. In the use of the arranement shown in Fig. 8A, drops of gasoline moving away from the impeller axis and passing out of contact with the vanes $L^{10}$ and $L^{11}$, are struck by the adjacent vanes $L^{11}$ and $L^{12}$, respectively. The impact of the vanes $L^{11}$ and $L^{12}$ against the outwardly moving gasoline drops, subjects said drops to a further disintegrating or atomizing action and also to a heating action, and each of said actions facilitates ignition of the combustible mixture and thus makes it easier to start the heater into operation at low temperatures.

The special mechanical atomizing provisions shown herein and comprising a high speed rotary air fan impeller and means for jetting the gasoline against the central portion of the impeller are not our joint invention, but were invented jointly by Frederic O. Hess, one of the applicant's herein and John W. Townsend, and are disclosed and claimed in their application, Serial No. 365,804, filed November 15, 1940, now Patent No. 2,314,089, granted March 16, 1943.

In Fig. 9 we have illustrated an especially desirable form of the present invention including advantageous structural features, and two expedients employed to facilitate the heater starting operation at low temperatures. One of the expedients consists in shaping the passages through which the combustible mixture passes from the combustion air supply and atomizing fan so as to give the atomized gasoline in the mixture a substantial velocity component in the direction toward the burner orifice wall as it approaches the latter. The second of the expedients consists in putting the burner at the top of the heater so that it will burn downward, and supplying the combustible mixture by fan and atomizing means so that gravitational tendency is to keep atomized gasoline in the mixture instead of causing it to drop out of the mixture. As will be apparent either of the two expedients may be used without the other, but in the preferred construction shown in Fig. 9, the two expedients are used conjointly.

In the construction shown in Fig. 9, the burner inlet chamber BA receives combustible mixture from the combustion air supply and gasoline atomizing fan LA through the smoothly curved passages $B^{10}$ including upper portions extending radially away from the fan chamber and lower portions opening vertically downward into the burner chamber BA.

In a general way the heater shown in Fig. 9 is such a heater as is shown in Fig. 1 or in Fig. 7, turned upside down, i. e. reversed end for end. The construction shown in Fig. 9 also simplifies and improves the heater and facilitates the disassembly and reassembly of the heater, making it possible to remove and replace as a unit, the combustion air supply and atomizing fan LA, the exhaust fan JA and the motor N driving both of the fans. Moreover, when the motor N drives the gasoline supply pump as it does in Fig. 7, that fan may be included in the removable and replaceable unit. As shown in Fig. 9, however, the gasoline supply pump is not included in said unit. As shown in Fig. 9 the fan LA works in a fan chamber between stationary upper and lower casing parts MA and KA, and the exhaust fan JA works in a fan chamber between the stationary casing parts KA and KB. Beneath the casing part KB is a stationary casing part KC which unites with the part KB to form channels JB through which products of combustion move radially inward to the central annular inlet JA' to the fan chamber for the exhaust fan JA. From the periphery of the last mentioned chamber products of combustion pass through channels $J^{40}$ to a heater outlet chamber $J^{50}$ connected to an outlet passage $J^6$ of the character shown in Fig. 2.

The part KC may be and as shown is integral with the part KB. The parts MA, KA, KB and KC are so shaped and disposed relative to a supporting seat formed on the end member AA, that on the removal of clamping screws (not shown) which normally secure the casing parts MA, KA, KB and KC to the member AA, the removal of the circulating fan OA from the shaft of the motor N, the latter along with the fans LA and JA and the casing parts MA, KA, KB and KC, may be separated as a unit from the latter.

In Fig. 9 the end casing FA remote from the burner is formed with inwardly extending branches HA' from the chamber HA which are connected by tubes IA to the receiving channels JB. Bolts $ia$ connect the end casing FA to the end casing AA and thereby releasably hold the heat exchange structure together. The heater shown in Fig. 9 may have fuel and air supply, and ignition and control adjuncts like those included in the apparatus previously described.

As shown, the fan impeller element JA and the partition part KB are formed with overlapping hub flanges $JA^2$ and KC' which cooperate to form a heat shield interposed between the motor shaft N' and the hot products of combustion flowing through the channels JB and fan chamber inlet JA'. Such a heat shield reduces the operating temperature of the shaft N' several degrees.

As shown, also, the fans LA and JA have telescopic engaging hub flange portions which contribute to the rigidity of the high speed fan structure, and the arrangement shown in Fig. 9 has the special advantage that the two rotating fans LA and JA may be balanced as a single rotative unit.

Our experimental investigations indicate that the combustion air and gasoline supply provisions shown in Fig. 9, substantially eliminate the difficulties sometimes experienced heretofore in starting such a heater as is shown in Fig. 1, into operation when the temperature is not higher than about 20° F. below zero. Our experimental investigations indicate also that with the combustion air and gasoline supply passages shaped as shown in Fig. 9, to give the air and fuel mixture a substantial component of flow in the direction of the burner orifices as the mixture approaches the refractory burner wall in which the orifices are found, much of the difficulty heretofore experienced in starting the heater into operation at temperatures considerably below zero will be avoided, even though the burner is located at the lower end of the heater as has been customary heretofore.

With the burner at the upper end of the heater the fan OA for circulating the air to be heated, is conveniently located at the bottom of the heater as shown in Fig. 9, with the resultant advantage of working on said air before the latter is heated and expanded by the heater.

The relative mechanical simplicity and effectiveness of the structure shown in Fig. 9 and the ease with which the Fig. 9 apparatus may be disassembled for inspection and repairs, and reassembled will be plainly apparent to those skilled in the art.

While in accordance with the provisions of the statutes, we have illustrated and described the best forms of embodiment of our invention now known to us, it will be apparent to those skilled in the art that changes may be made in the forms of the apparatus disclosed without departing from the spirit of our invention, as set forth in the appended claims, and that in some cases certain features of our invention may be used to advantage without a corresponding use of other features.

Having now described our invention, what we claim as new and desire to secure by Letters Patent is:

1. An airplane heater comprising a member formed with an annular burner chamber and with an exhaust fan chamber coaxial with and surrounded by said burner chamber, means forming a heating chamber coaxial with said burner chamber and receiving combustion air and fuel therefrom, a second member longitudinally displaced from the first mentioned member and formed with a chamber receiving products of combustion from said heating chamber, and conduit means for conducting products of combustion from the second member to said exhaust fan chamber.

2. An airplane heater comprising a member formed with an annular burner chamber and with an exhaust fan chamber coaxial with and surrounded by said burner chamber, means forming a heating chamber coaxial with said burner chamber and receiving combustion air and fuel therefrom, a second member longitudinally displaced from the first mentioned member and formed with a chamber receiving products of combustion from said heating chamber, and tubular tie bolts connecting said members and forming conduits for conducting products of combustion from said second member to said exhaust fan chamber.

3. An airplane heater comprising a member formed with an annular burner chamber and with an air supply fan chamber coaxial with and surrounded by said burner chamber, and with an exhaust fan chamber coaxial with and alongside said supply fan chamber, said supply fan chamber having a central inlet and a peripheral outlet connection to said burner chamber and said exhaust fan chamber having a central inlet and a periphery outlet connection extending longitudinally past the periphery of the supply fan chamber, means forming a heating chamber coaxial with said burner chamber and receiving combustion air and fuel therefrom, a second member longitudinally displaced from the first mentioned member and formed with a chamber receiving products of combustion from said heating chamber, and conduit means for conducting products of combustion from said second member to said exhaust fan chamber inlet.

4. An airplane heater comprising a member formed with an annular burner chamber and with air supply fan and exhaust fan chambers coaxial with and surrounded by said burner chamber, means forming a heating chamber coaxial with said burner chamber and receiving combustion air and fuel therefrom, a second member longitudinally displaced from the first mentioned member and formed with a chamber receiving products of combustion from the adjacent end of said heating chamber, conduit means for conducting products of combustion from the second member to said exhaust fan chamber, a motor within the space surrounded by said heating chamber and having a shaft portion, and fan impellers mounted on said shaft portion and working in said fan chambers.

5. An airplane heater comprising a member formed with an annular burner chamber and with air supply fan and exhaust fan chambers coaxial with and surrounded by said burner chamber, means forming a heating chamber coaxial with said burner chamber from which combustion air and fuel passes into the adjacent end of the heating chamber, a second member longitudinally displaced from the first mentioned member and formed with a chamber receiving products of combustion from the second end of said heating chamber, conduit means for conducting products of combustion from the second member to said exhaust fan chamber, a motor within the space surrounded by said heating chamber and having shaft portions at its opposite ends, fan impellers mounted on one shaft portion and working in said fan chambers, and a fan impeller carried by the other shaft portion for moving air to be heated past said heating chamber.

6. An airplane heater comprising an end member formed with an annular burner chamber and including a side wall portion of an exhaust fan chamber coaxial with and surrounded by said burner chamber, a partition member forming the other side wall of said exhaust fan chamber and the adjacent side wall of an adjacent air supply fan chamber and a third member forming the other side wall of the supply fan chamber, means forming a heating chamber coaxial with said burner chamber and in communication therewith, a second end member formed with a chamber receiving products of combustion from said heating chamber, and conduit means for conducting products of combustion from the second member to said exhaust fan chamber.

7. An airplane heater comprising an end casing formed with an annular burner chamber and including one side wall portion of a first fan chamber coaxial with and surrounded by said burner chamber and having a central inlet, a disc like partition member forming the second side wall of said first fan chamber and one side wall of a second fan chamber, and a third member forming the second side wall of the second fan chamber and formed with a central inlet opening therefor and an exhaust passage, means forming a heating chamber coaxial with said burner chamber and receiving combustion air and fuel therefrom, an end member displaced longitudinally of the heater from said end casing and formed with a chamber receiving products of combustion from said heating chamber, and conduit means for conducting products of combustion from the end member to the first fan chamber, said end casing being formed with a passage through which products of combustion pass from the periphery of said first fan chamber to said exhaust passage.

and with a passage leading from the periphery of the second fan chamber to said burner chamber.

8. In an airplane heater the combination with means forming an annular heating chamber, of a motor within the space surrounded by said heating chamber and comprising a shaft coaxial with said chamber, a fan including a first impeller mounted on the shaft for supplying combustion air to said heating chamber, an exhaust fan for withdrawing products of combustion from said heating chamber and including an impeller mounted on said shaft along side the first impeller, casing means providing side by side fan chambers in which said impellers are respectively mounted with a peripheral outlet from each fan chamber and with a central annular inlet for each fan chamber in its side wall remote from the other fan chamber.

9. An airplane heater combination as specified in claim 8, in which said casing means and exhaust fan impeller comprise portions coacting to form a heat shield between said shaft and the products of combustion passing into the exhaust fan chamber through its inlet.

10. An airplane heater combination as specified in claim 8 in which said impellers have hub portions in engagement with one another and may be balanced together as parts of a single rotative unit.

11. In an airplane heater, the combination with a stationary metallic structure formed with an annular heating chamber and with an annular burner chamber at one end of said heating chamber and with an annular seat adjacent said burner, of a motor in the space surrounded by said heating chamber and having its shaft coaxial with said seat, supply and exhaust fans respectively supplying a combustible material to and withdrawing products of combustion from said heating chamber and each comprising an impeller mounted on said shaft, and fan casing means forming separate fan chambers for said impellers and uniting with said motor to form a structural unit removably mounted in said seat.

12. The combination with an airplane having a shell formed with two inlets for the inflow of atmospheric air, and means for passing supercharged air through one of said inlets comprising scoop means at the outer side of said shell associated with one of said inlets and in which a pressure exceeding the pressure of the atmosphere is induced by the movement of the airplane, and pressure responsive means responsive to atmospheric pressure to regulate the relative amounts of air inflowing through the two inlets.

13. A heater comprising means forming a heating chamber and a burner at one end of said chamber, structure including a fan and a pump for supplying combustion air and liquid fuel to said burner, an impeller for moving air to be heated in heat exchange relation with said chamber, a casing for the pump, means including a portion of the pump casing forming a space communicating with the inlet of the air supply fan, discharge means connected to the pump and delivering fuel to said space, and an electric motor connected to drive said pump and fan and impeller.

14. A heater comprising means forming a heating chamber, a burner at one end of the chamber, structure including a pump and a combustion air supply fan for supplying fuel and combustion air to said burner, an exhaust fan for withdrawing products of combustion from the chamber, a circulating fan for moving air to be heated in heat exchange relation with said chamber, a casing for the pump, means including a portion of the pump casing forming a space communicating with the inlet of the air supply fan, discharge means connected to the pump and delivering fuel to said space, and electrical means for driving said fans and the pump.

15. A heater for aircraft comprising structure providing a heat radiating unit including a combustion chamber, means for supplying to said chamber a combustible mixture of fuel and air, conduit means for conducting products of combustion from said heat radiating unit, said conduit means having an outlet adapted to discharge the products of combustion to the atmosphere enveloping the aircraft, said outlet being subject to variations in pressure during flight of the aircraft, means to reduce the effect of such variations in pressure upon the combustion conditions in said combustion chamber including a fan in said conduit means and an orifice forming means providing a constriction in said conduit means intermediate said fan and the outlet, and said fan being operable to build up such a pressure in said conduit means from the discharge end thereof to the constriction that the full variation in pressure to which said outlet may be subjected during flight of the aircraft will not be reflected back to said combustion chamber.

16. A heater for aircraft comprising structure providing a heat radiating unit including a combustion chamber, means for supplying to said chamber a combustible mixture of fuel and air including a first conduit means having an inlet and through which is adapted to flow air at a pressure dependent upon the altitude of the aircraft, a second conduit means for conducting products of combustion from the heat radiating unit, said second conduit means having an outlet adapted to discharge the products of combustion to the atmosphere enveloping the aircraft, said inlet and outlet being subject to variations in pressure during flight of the aircraft, and means to reduce the effect of such variations in pressure on the combustion conditions in said combustion chamber including a first fan in said first conduit means and a second fan in said second conduit means and an orifice forming means providing a constriction in said second conduit means intermediate said fan and the outlet, and said second fan being operable to build up such a pressure in the second conduit means from the discharge end thereof to the constriction that the full variation in pressure to which said outlet may be subjected during flight of the aircraft will not be reflected back to said combustion chamber.

FREDERIC O. HESS.
CARL P. MANN.